Aug. 28, 1923.　　　　　　　　　1,466,332
F. H. CRAGO
TRAP
Filed April 18, 1922　　　2 Sheets-Sheet 1
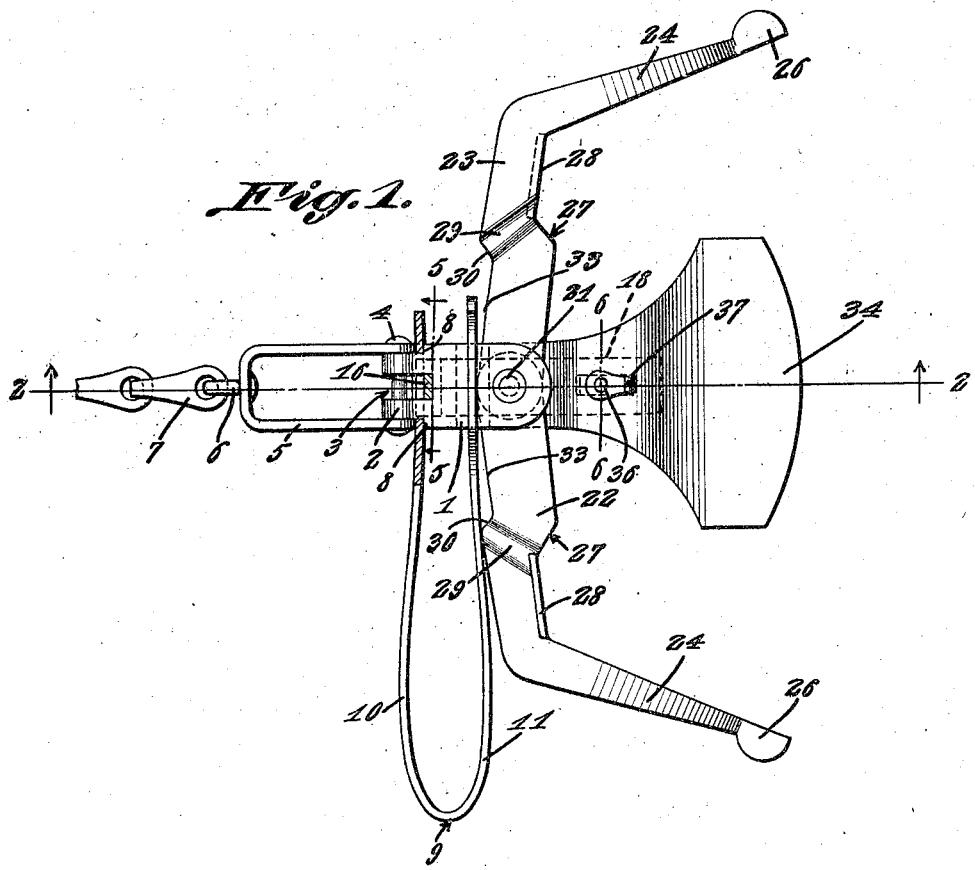
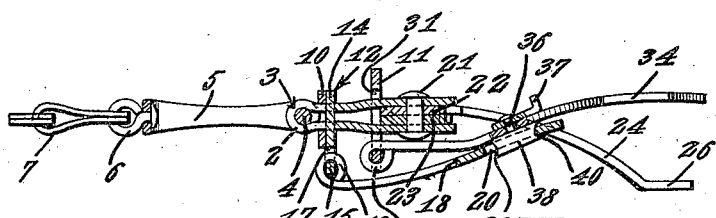
F. H. Crago, Inventor Aug. 28, 1923.
F. H. CRAGO
1,466,332
TRAP
Filed April 18, 1922
2 Sheets-Sheet 2
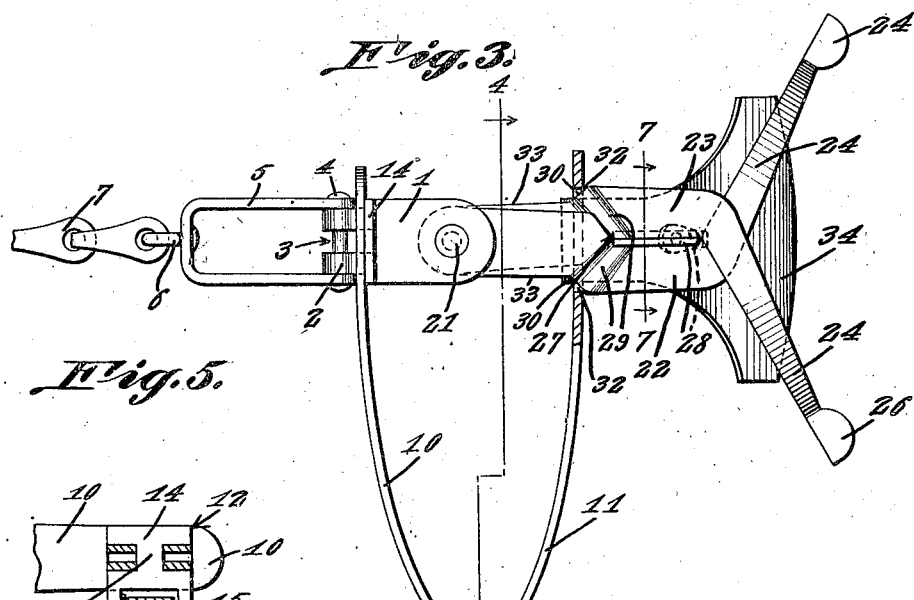
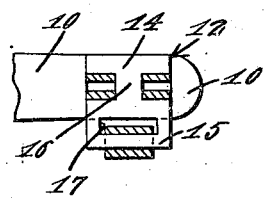
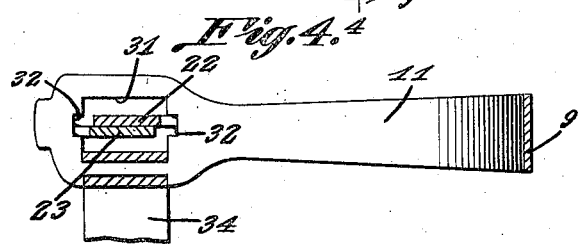
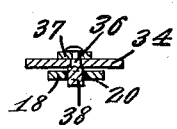
F. H. Crago, Inventor Patented Aug. 28, 1923.

1,466,332

UNITED STATES PATENT OFFICE.

FELIX H. CRAGO, OF MILLTOWN, MONTANA.

TRAP.

Application filed April 18, 1922. Serial No. 554,412.

*To all whom it may concern:*

Be it known that I, FELIX H. CRAGO, a citizen of the United States, residing at Milltown, in the county of Missoula and State of Montana, have invented a new and useful Trap, of which the following is a specification.

The device forming the subject matter of this application is a trap, and one object of the invention is so to improve the jaws of the trap that the same will grip and hold the animal securely it being practically impossible for the animal to tear its leg out from between the jaws. Another object of the invention is to provide novel spring means for actuating the jaws. A further object of the invention is to provide novel means for holding the spring in place. The invention aims to so construct the spring and the jaws, that the spring will prevent the jaws from spreading when the trap is sprung.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a trap constructed in accordance with the invention; Figure 2 is a section on the line 2—2 of Figure 1; Figure 3 is a plan of the trap, the trap being sprung in Figure 3 and being set in Figure 1; Figure 4 is a section on the line 4—4 of Figure 3; Figure 5 is a section on the line 5—5 of Figure 1; Figure 6 is a section on the line 6—6 of Figure 1; Figure 7 is a section on the line 7—7 of Figure 3.

The trap forming the subject matter of this application embodies a U-shaped frame 1 provided at its rear end with a bend or socket 2. A slot 3 is formed in the bend or socket 2 and is extended into the body portion of the frame 1. A pivot element 4 is mounted in the socket 2. A connecting element 5, such as a yoke, is carried by the pivot element 4, the socket 2 of the frame 1 extending between the side arms of the yoke 5. A swivel 6 is carried by the rear end of the yoke 5. A chain or other flexible element may be connected to the swivel 6. The frame 1 is provided in its outer edges with shoulders 8 located slightly in advance of the socket 2. The numeral 9 marks a U-shaped expansion spring including arms 10 and 11. The frame 2 extends through the arm 10, the said arm 10 being held between the shoulders 8 and the forward end of the yoke 5. The arm 10 of the spring is retained, further, by a securing element denoted generally by the numeral 12. The securing element 12 comprises a head 14, a foot 15 and a reduced neck 16 connecting the head and the foot, the foot having an opening 17. The neck 16 of the securing element 12 is disposed in the slot 3 of the frame 1, the head 14 of the securing element lies above the frame 1 in advance of the arm 10 of the spring 9, and the foot 15 of the securing element lies below the frame 1, in advance of the arm 10 of the spring 9, all of which will be understood clearly when Figures 5, 3 and 1 are examined. A forwardly extended latch 18 is disposed beneath the frame 1 and is pivotally mounted at 19 in the opening 17 of the foot 15 of the securing element 12. Adjacent to its forward end the latch 18 has an opening 20. A pivot element 21 is mounted in the forward end of the frame 1. An upper jaw 22 and a lower jaw 23 are provided, the rear ends of the jaws being disposed within the frame 1 and being mounted to swing on the pivot element 21. The jaws 22 and 23 have angular ends 24. The jaws are so shaped that, when the trap is sprung, as shown in Figure 3, the angular end 24 of the upper jaw 22 extends beneath the angular end 23 of the upper jaw 22 at the point where the said extensions cross, as shown in Figure 3. The result is that the jaws are strengthened greatly, so far as their hold on the leg of the animal is concerned. The ends 24 of the jaws 22 and 23 are curved downwardly, and terminate in broadened, angularly disposed feet 26, the construction being such that the jaws will aid in supporting the trap, when the trap is set as shown in Figure 1. In the inner edges of the jaws 22 and 23, intermediate the ends of the jaws, recesses 27 are formed. Flanges 28 project upwardly and downwardly, in opposite directions, from the jaws 22 and 23, and are located at the bases of the recesses 27. The jaws are provided with transverse reinforcing ribs 29, the jaws being offset, so that the outer ends of the ribs form shoulders 30, the function of which will be set forth hereinafter. To the rear of the shoulders 30, the jaws 22 and 23 are supplied with straight outer edges, marked by the numeral 33.

The arm 11 of the spring 9 is provided with an opening 31 wherein the frame 1 of the trap is received, when the trap is set as shown in Figure 1. The opening 31 has reduced extensions 32 at its ends. When the trap is sprung, as shown in Figure 3, the arm 11 of the spring 9 advances along the straight edges 33 of the jaws 22 and 23, to abutment with the stop shoulders 30 on the jaws. The jaws, when the trap is sprung, are received in the extensions 32 of the opening 31, as shown in Figure 4, and, consequently, the jaws cannot be sprung apart vertically, the strength of the device being increased accordingly. At this point, it may be profitable to observe that the function of the flanges 28, shown in Figure 7 is to prevent such an indentation or cutting of the leg of the animal, that the animal can tear its leg and escape, when the leg is gripped by the jaws. When the jaws 22 and 23 move from the open position of Figure 1 to the closed position of Figure 3, the leg of the animal is engaged by the inner edges of the extensions 24 of the jaws, and is passed or crowded backwardly, for engagement by the flanges 28.

The numeral 34 marks a trigger, disposed below the jaws 22 and 23, and located above the latch 18. The rear end of the trigger 34 is pivoted at 35 to the movable end of the arm 11 of the spring 9. A shaft 36 is journaled in the trigger 34 and is provided at its upper end with a finger piece 37 whereby the shaft may be rotated. At its lower end, the shaft 36 carries a head 38 adapted to be received in the opening 20 of the latch 18. In the opposite ends of the head 38, notches 39 and 40 are fashioned. The notch 40 preferably is more pronounced or deeper, than is the notch 39.

When the trap is set, as shown in Figure 1, the jaws 22 and 23 are swung to open positions, the arm 11 of the spring 9 being carried backwardly on the frame 1. The head 38 on the trigger 34 is engaged in the opening 30 of the latch 18 as shown in Figure 2. When an animal treads on the trigger 34, the trigger is swung downwardly, the head 38 being disengaged from the opening 20 in the latch 18 whereupon the arm 11 of the spring 9 will be moved forwardly, closing the jaws in the position shown in Figure 3 of the drawings. As the arm 11 of the spring 9 moves forwardly, the trigger 34 moves downwardly into engagement with the ground, and serves to raise the forward end of the trap. The forward end of the trap, therefore is carried upwardly, and the leg of the animal is gripped by the jaws 22 and 23, at a point well above the hoof, the hold of the trap on the leg of the animal being increased accordingly. The head 38 on the trigger 34 may be turned end for end, when the shaft 36 is rotated by the finger piece 37. Thus, either of the notches 39 or 40 may be brought into engagement with the latch 18, and since these notches 39 and 40 are formed differently, the trap may be so arranged that it may be sprung either by a light pressure or by a considerable pressure, exerted on the trigger 34.

What is claimed is:—

1. A trap comprising a frame; jaws pivoted to the frame; a spring comprising an arm fixed to the frame, and an arm movable on the frame and on the jaws to close the jaws; a latch pivoted to the fixed arm of the spring; a trigger pivoted to the movable arm of the spring; and interengaging elements on the trigger and on the latch.

2. In a device of the class described, a frame; jaws pivoted to the frame; a spring comprising arms, one of which is fixed to the frame, the other of which is movable with respect to the frame and the jaws to close the jaws; a latch pivoted to the fixed arm of the spring; a trigger pivoted to the movable arm of the spring and held on the trigger and adapted to cooperate with the latch, the head having differently shaped elements adapted to engage the latch to adjust the force required to spring the trap, the head being rotatable to bring either of said elements into engagement with the latch, at the will of an operator.

3. In a device of the class described, a frame; upper and lower jaws pivoted to the frame, the jaws having angular extensions, the extensions being crossed when the arms are brought together, the extension on the upper jaw extending beneath the extension of the lower jaw when the jaws are brought together, the jaws being provided, to the rear of the extensions, with flanges increasing the thickness of the jaws at their meeting edges; spring means for closing the jaws; and means for releasing the jaws or closing, responsive to the spring means.

4. In a device of the class described, a frame; jaws pivoted to the frame, the jaws having angular extensions which are crossed when the jaws are brought together, the jaws being downwardly inclined, toward their free ends; spring, means for closing the jaws; and mechanism for releasing the jaws for closing movement responsive to the spring means.

In testimony that I claim the foregoing as my own, I have hereto affixed my signature in the presence of two witnesses.

FELIX H. CRAGO.

Witnesses:
  JOSIAH SHULL,
  FREDERICK D. CHISLER.